(12) United States Patent
Sylvester et al.

(10) Patent No.: US 12,528,427 B2
(45) Date of Patent: Jan. 20, 2026

(54) MULTI-POSITION LOW PROFILE SNAP ON MOUNT ASSEMBLY

(71) Applicant: Panduit Corp., Tinley Park, IL (US)

(72) Inventors: David J. Sylvester, Manhattan, IL (US); Rodney G. Rouleau, Manhattan, IL (US); Mary G. Santschi, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 21 days.

(21) Appl. No.: 18/528,980

(22) Filed: Dec. 5, 2023

(65) Prior Publication Data
US 2025/0178546 A1 Jun. 5, 2025

(51) Int. Cl.
*B60R 16/02* (2006.01)
*H02G 3/30* (2006.01)

(52) U.S. Cl.
CPC ........... *B60R 16/0215* (2013.01); *H02G 3/30* (2013.01)

(58) Field of Classification Search
CPC ...... B60R 16/0215; H02G 3/30; H02G 3/263; H02G 3/32; H02G 3/02; F16B 5/0685; F16B 21/06; F16L 3/2235; B60Y 2410/115
USPC .................................................. 248/71, 68.1
See application file for complete search history.

(56) References Cited

U.S. PATENT DOCUMENTS

| | | | |
|---|---|---|---|
| 3,632,069 A | 1/1972 | Thayer et al. | |
| 4,518,138 A * | 5/1985 | Stutenkemper | F16B 5/06 248/220.21 |
| 4,974,798 A * | 12/1990 | Harding | H02G 3/26 248/222.12 |
| 5,168,904 A | 12/1992 | Quinkert et al. | |
| 5,390,876 A * | 2/1995 | Hatano | F16L 3/1075 248/74.1 |
| 5,547,152 A | 8/1996 | Krock | |
| 5,597,980 A * | 1/1997 | Weber | H02G 3/0418 174/72 A |
| 6,042,062 A * | 3/2000 | Sugiyama | B60R 16/0215 248/65 |
| 6,672,029 B2 * | 1/2004 | Tucker | B28B 23/0056 249/91 |
| 6,685,514 B2 * | 2/2004 | Costa | H01R 4/625 439/876 |
| 6,903,275 B1 * | 6/2005 | Jetton | B60R 16/0215 174/72 A |
| 7,290,739 B2 * | 11/2007 | Zeuner | H02G 3/30 248/229.11 |

(Continued)

FOREIGN PATENT DOCUMENTS

| | | |
|---|---|---|
| EP | 1772935 B1 | 6/2012 |
| EP | 2795140 B1 | 9/2016 |

(Continued)

*Primary Examiner* — Kimberly T Wood
(74) *Attorney, Agent, or Firm* — James H. Williams; Christopher S. Clancy (57) ABSTRACT

A mount assembly designed to secure cables to a vehicle frame. The mount assembly includes a base and a mount component based on the base. The base has a securement flange and a mating flange with a latch window. The mount component has an attachment member and a cable receiving member. The attachment member has a latch arm with a latch extending therefrom. The latch engages the latch window of the mating flange to secure the mount component to the base.

13 Claims, 14 Drawing Sheets

(56) References Cited

U.S. PATENT DOCUMENTS

| | | | |
|---|---|---|---|
| 7,661,631 B2* | 2/2010 | Ibaraki | F16L 3/1075 248/74.1 |
| 8,020,811 B2* | 9/2011 | Nelson | F16L 3/2235 248/65 |
| 8,585,121 B2 | 11/2013 | Marx et al. | |
| 8,590,847 B2 | 11/2013 | Guthke et al. | |
| 8,991,774 B2* | 3/2015 | Hajduch | H02G 3/32 248/220.22 |
| 9,067,717 B2* | 6/2015 | DeMik | F16L 3/221 |
| 9,528,535 B2 | 12/2016 | Massengill | |
| 9,534,708 B2 | 1/2017 | Cripps, II | |
| 9,856,998 B2 | 1/2018 | Cripps, II | |
| 9,920,858 B2 | 3/2018 | Harnetiaux | |
| 10,082,224 B2 | 9/2018 | Otterström | |
| 10,348,076 B2 | 7/2019 | Gallion et al. | |
| 10,428,976 B2 | 10/2019 | Matz | |
| 10,903,632 B2* | 1/2021 | Toll | F16L 3/1058 |
| 10,920,808 B2* | 2/2021 | Aoyama | F16B 2/10 |
| 11,305,708 B2* | 4/2022 | Lindner | F16L 3/00 |
| 11,991,853 B2* | 5/2024 | Chen | F16B 2/22 |
| 2003/0173470 A1* | 9/2003 | Geiger | F16L 55/035 248/55 |
| 2004/0076465 A1 | 4/2004 | Geiger | |
| 2007/0120023 A1* | 5/2007 | Martinez | F16L 3/22 248/68.1 |
| 2008/0105796 A1* | 5/2008 | Nix | F16L 3/222 248/74.1 |
| 2011/0303456 A1 | 12/2011 | Blanchard et al. | |
| 2013/0160246 A1* | 6/2013 | Hajduch | H02G 3/32 24/16 PB |
| 2013/0187012 A1 | 7/2013 | Blakely et al. | |
| 2016/0114743 A1* | 4/2016 | Miyamoto | H02G 3/32 224/557 |
| 2018/0072248 A1* | 3/2018 | Ohashi | F16L 3/1075 |

FOREIGN PATENT DOCUMENTS

| | | |
|---|---|---|
| EP | 3296604 A1 | 3/2018 |
| EP | 3809547 A1 | 4/2021 |
| WO | 2014193351 A1 | 12/2014 |

* cited by examiner

MULTI-POSITION LOW PROFILE SNAP ON MOUNT ASSEMBLY

FIELD OF THE INVENTION

The present invention relates to a mount assembly, and more particularly to a multi-position low profile snap on mount assembly.

BACKGROUND OF THE INVENTION

The transition from fossil fuel powered vehicles to electric powered vehicles continues to accelerate. Electric powered passenger vehicles have been leading the transition; however, now heavy duty trucks are making the conversion to be electric powered. As in any vehicle design, space and weight are top concerns when designing the vehicle or truck. Passenger vehicles are normally 4000 to 6000 pounds, while a fully loaded tractor trailer or heavy duty truck can weigh up to 80,000 pounds. Thus, more energy is required to power the heavy duty truck and the load in tow. The cables used to transport the electric currents are typically larger in heavy duty trucks and the batteries are further from the motors when compared to passenger vehicles. As a result, the electric vehicle manufacturers of heavy duty trucks and passenger vehicles desire a space and weight saving method for routing the power cables in the vehicles. There is a desire for the cable routing method to be low cost, easy to install and easy to remove for maintenance or repairs. There is also a desire for the cable routing method to withstand harsh environments and vibration associated with the truck or vehicle's outdoor road use.

SUMMARY OF THE INVENTION

The present invention is directed to a multi-position snap on mount assembly secured to a vehicle frame for routing cables. The snap on mount assembly includes a base and a mount component. The base has a securement flange and a mating flange with a latch window. The mount component is positioned on the base. The mount component has an attachment member and a cable receiving member. The attachment member has a latch arm with a latch extending therefrom. The latch engages the latch window of the mating flange to secure the mount component to the base to form the snap on mount assembly.

DETAILED DESCRIPTION

Figure 1:
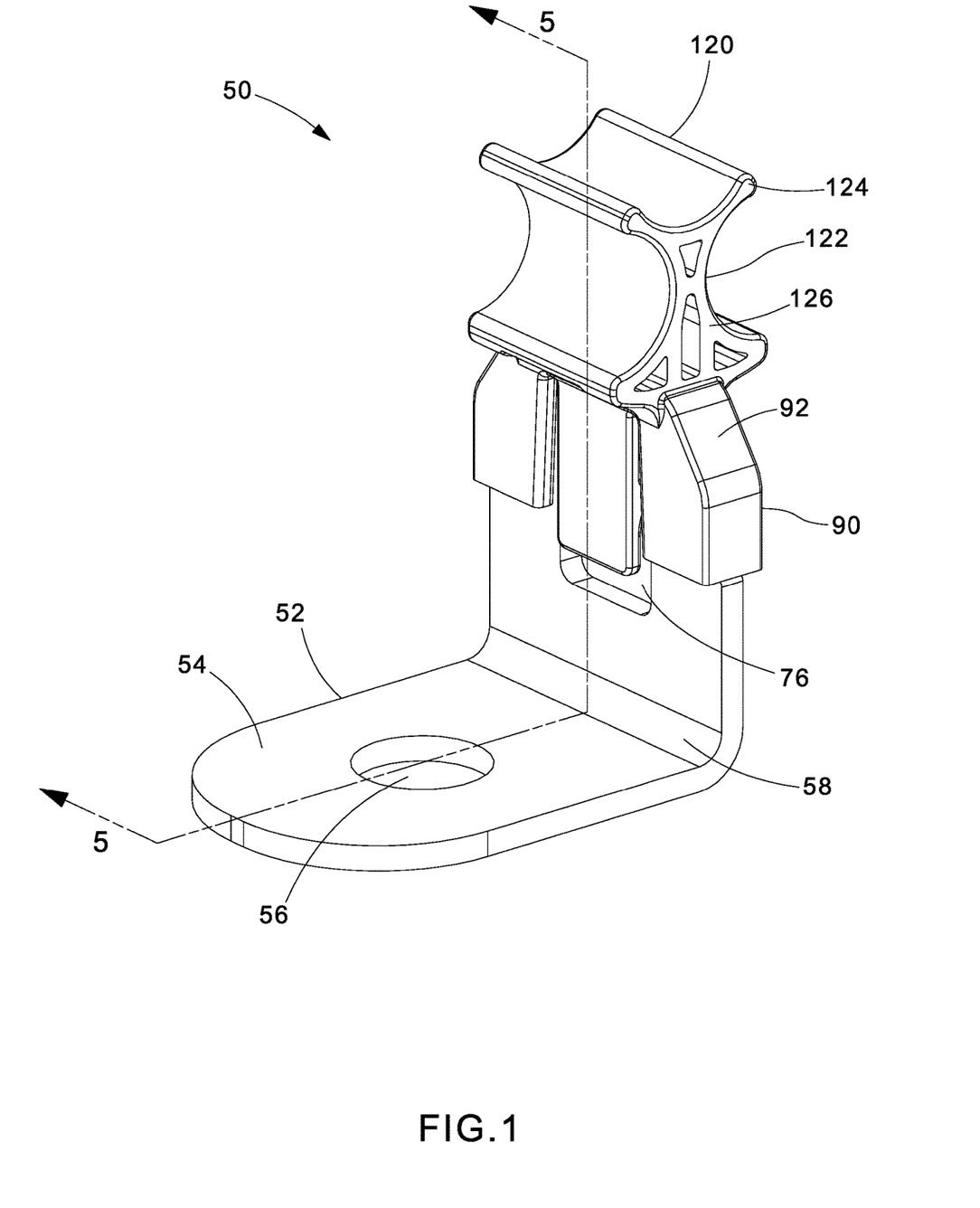
FIG. 1 is a front perspective view of the multi-position low profile snap on mount assembly of the present invention.

FIG. 1 illustrates the multi-position low profile snap on mount 50 of the present invention. The snap on mount 50 includes a base 52 and a mount component 90 designed to accommodate up to three cables.

Figure 2:
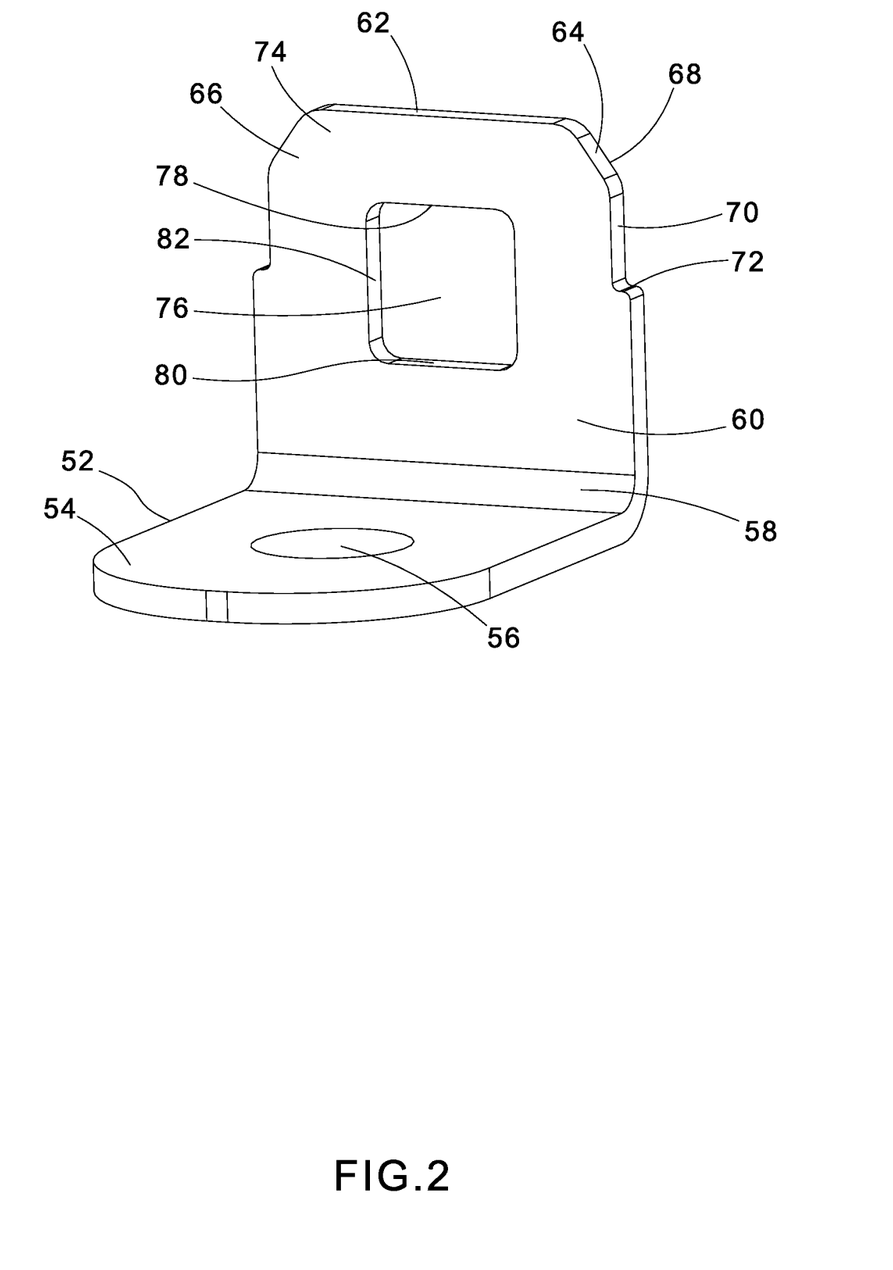
FIG. 2 is a perspective view of the base of the multi-position low profile snap on mount assembly of FIG. 1.

FIG. 2 illustrates a perspective view of the base 52 of the snap on mount 50. The base 52 is formed from stamped steel; however, other materials and manufacturing methods could be used. The base 52 includes a securement flange 54, a 90 degree bend 58, and a mating flange 60 that is perpendicular to the securement flange 54. The securement flange 54 includes a mounting hole 56. The mounting hole 56 receives a fastener 202 to secure the base 52 to a vehicle frame 200 (see FIGS. 7-10). The mating flange 60 includes a top 62, a front 66, a back 68, and sides 70. The top 62 includes tapered corners 64 and the sides 70 include recessed mating cutouts 72 that define an upper portion 74 of the mating flange 60. The mating cutouts 72 include a horizontal indentation that leads to a vertical side extending to the tapered corner 64. The mating flange 60 also includes a latch window 76 centered in the mating flange 60. The latch window 76 is rectangular with a top 78, a bottom 80, and sides 82.

Figure 3:
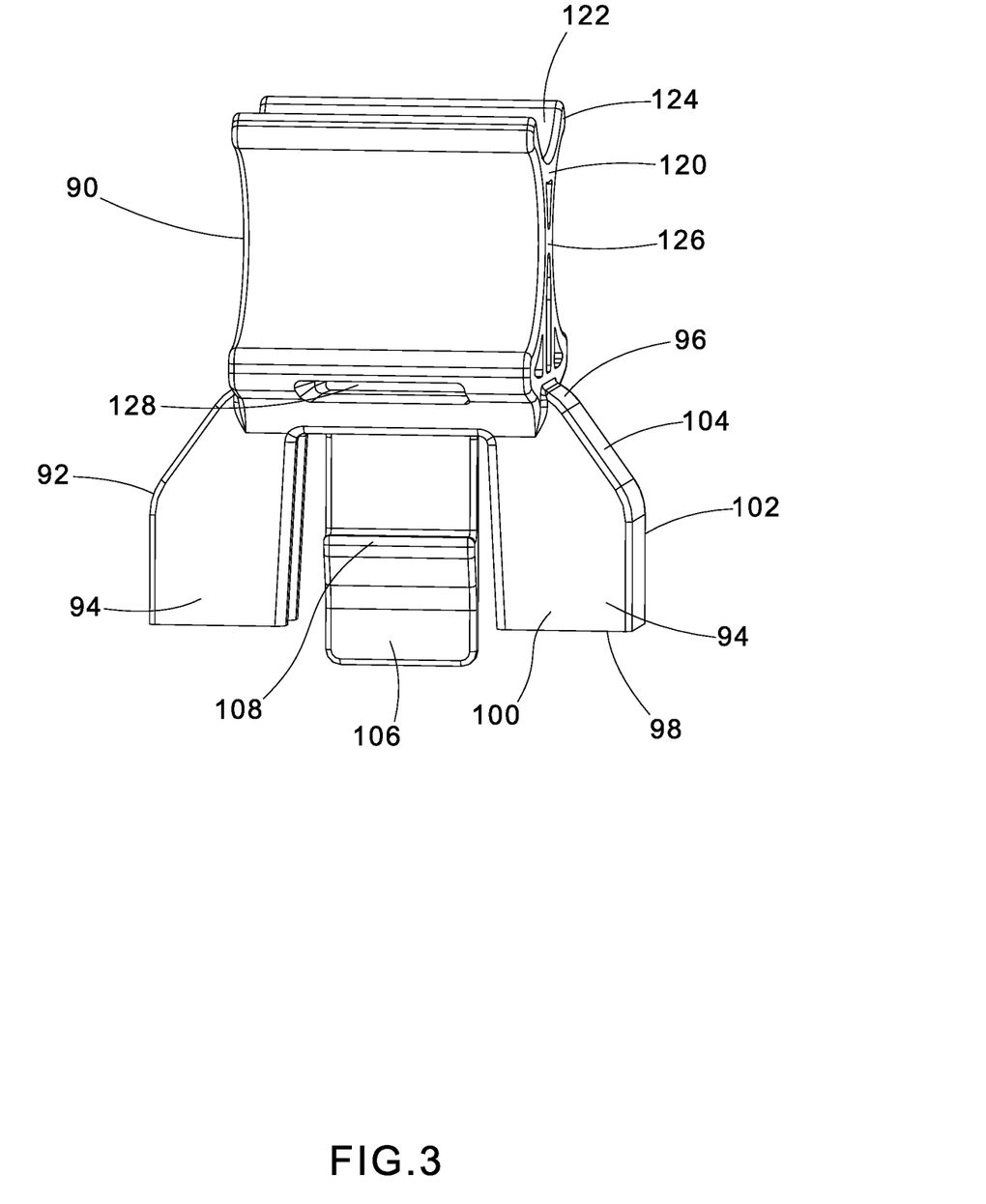
FIG. 3 is a perspective view of the mount component of the multi-position low profile snap on mount assembly of FIG. 1.
Figure 4:
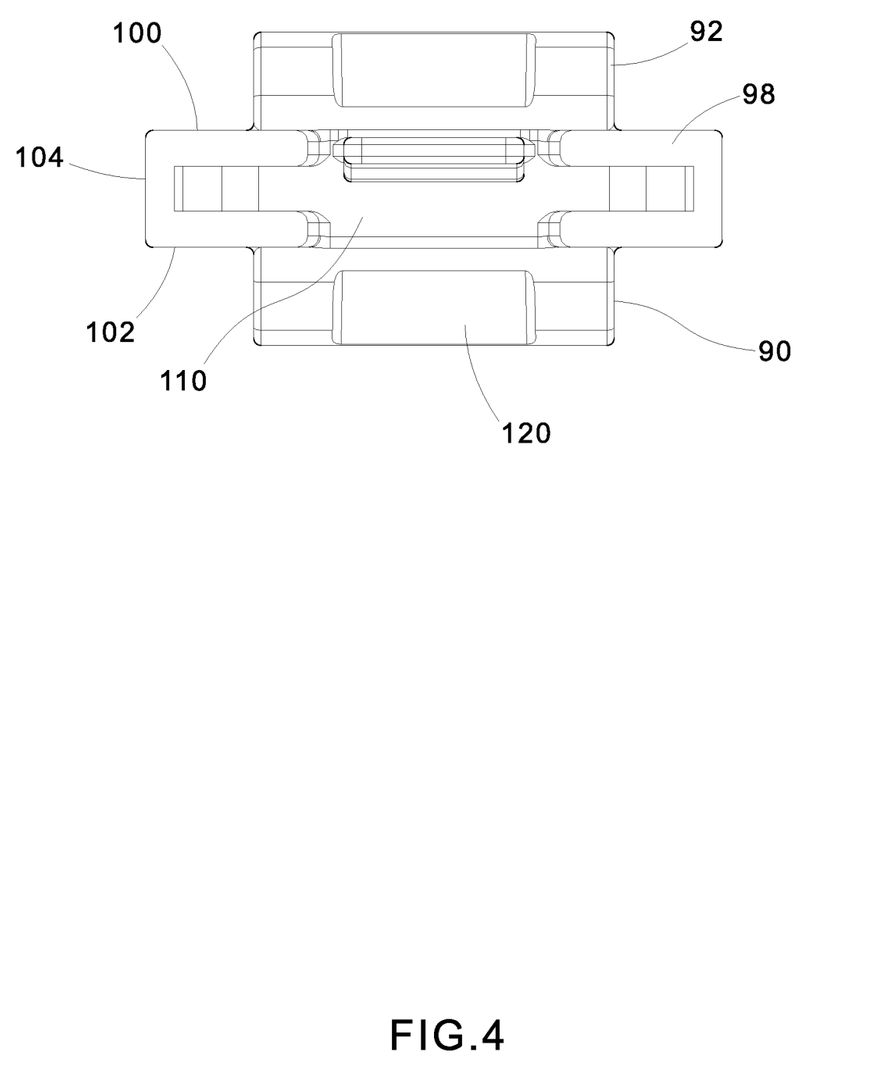
FIG. 4 is a bottom view of the mount component of FIG. 3.

FIG. 3 illustrates the mount component 90 of the snap on mount 50. The mount component 90 is injection molded with a robust polymer. The mount component 90 includes an attachment member 92 and a cable receiving member 120. The attachment member 92 includes legs 94 with a top 96, a bottom 98, a front 100, a back 102, and sides 104. The attachment member 92 includes a latch arm 106 with a latch 108 extending between each leg 94. The latch 108 is a projection that extends toward the center of the attachment member 92. The latch arm 106 extends longer than the legs 94 to facilitate engagement with the latch window 76 in the mating flange 60 of the base 52. As illustrated in FIG. 4, the attachment member 92 also includes a mating cavity 110. The mating cavity 110 is defined by the top 96, bottom 98, front 100, back 102 and sides 104 of the legs 94. As described below, the mating cavity 110 receives the mating flange 60 of the base 52 to form the snap on mount assembly.

The cable receiving member 120 includes cable receiving lobes 122, cable spacer arms 124, and a lobe stem 126. The lobe stem 126 is a vertical member that provides support for the cable spacer arms 124. The cable spacer arms 124 extend from the lobe stem 126 and include curved outer ends. The lobe stem 126 spaces the cable spacer arms 124 to create the cable receiving lobes 122. As illustrated in FIG. 1, the cable spacer arms 124 define three concave cable receiving lobes 122 for receiving a cable. The cable receiving member 120 also includes a centered cable tie pass thru slot 128 for receiving a cable tie 210 to secure the cables 220 positioned on the cable receiving lobes 122.

Figure 5:
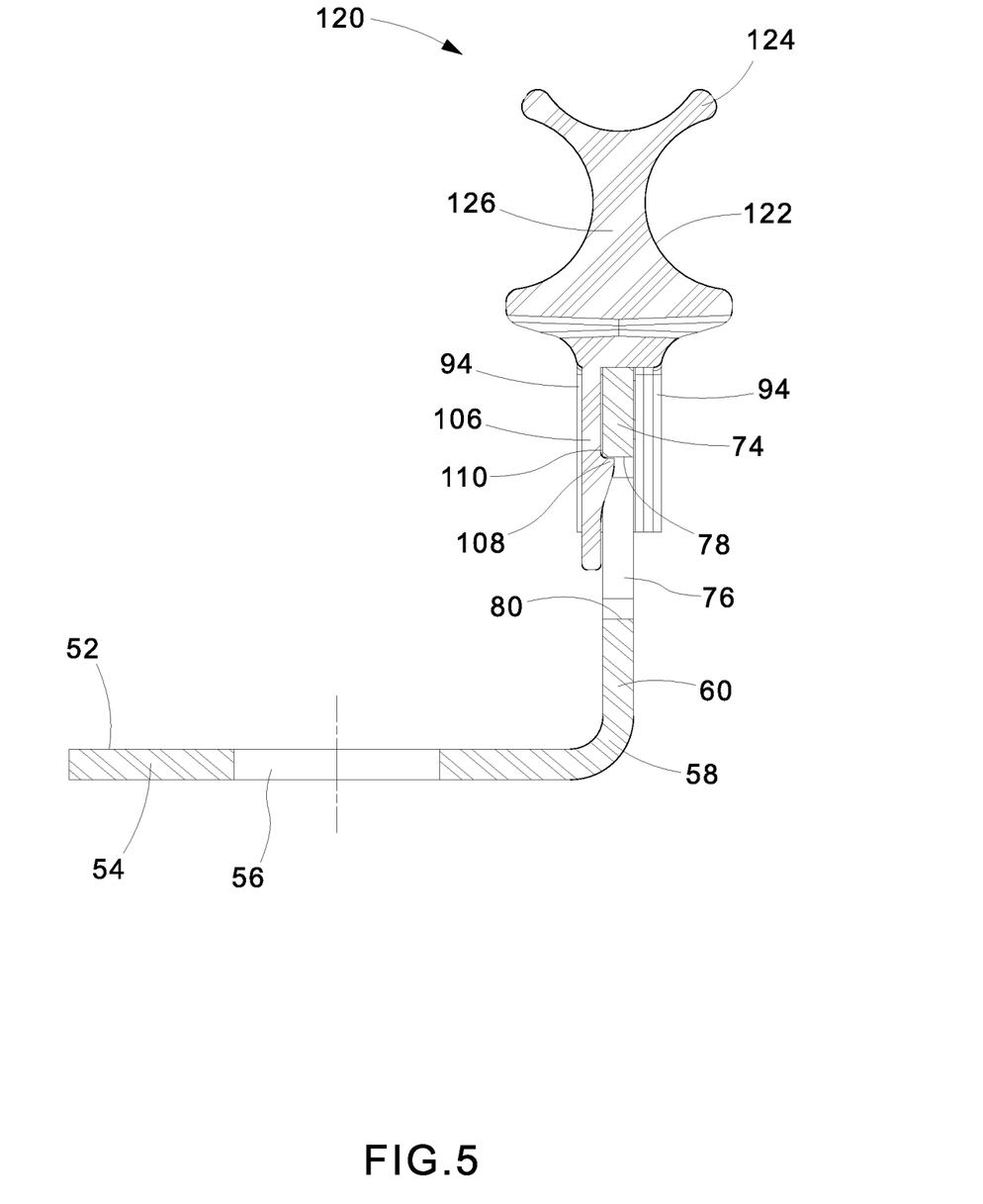
FIG. 5 is a cross sectional view of the multi-position low profile snap on mount assembly of FIG. 1 taken along line 5-5.
Figure 6:
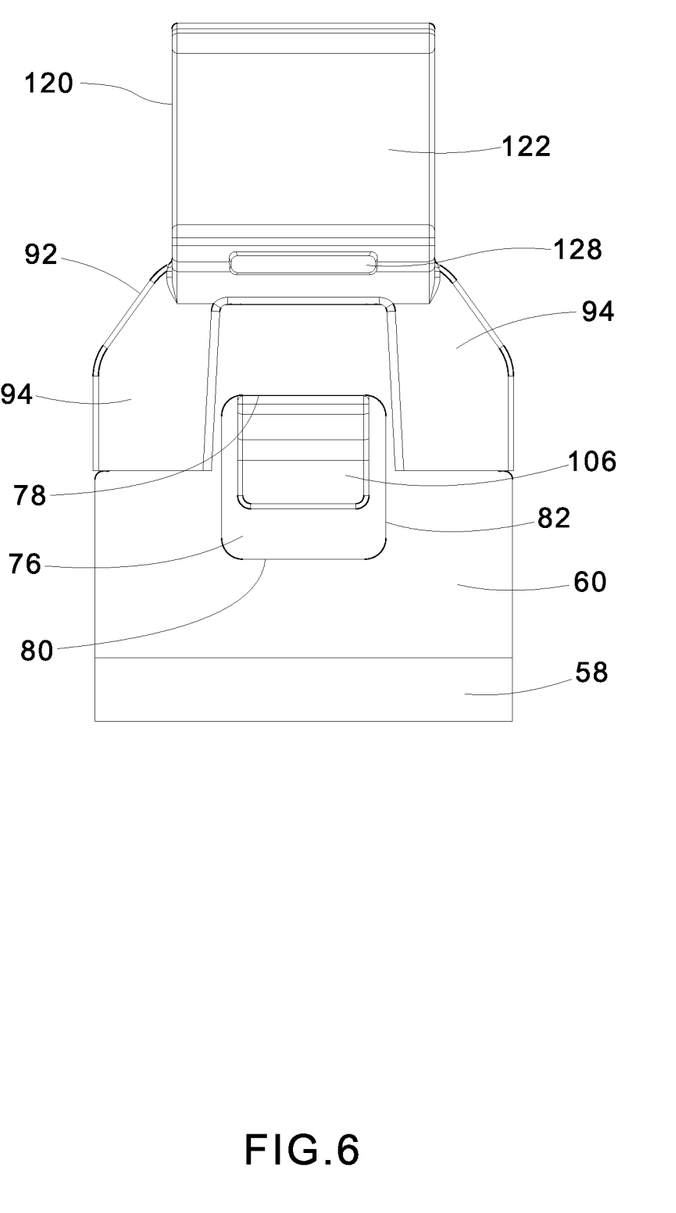
FIG. 6 is a back view of the multi-position low profile snap on mount assembly of FIG. 1.
Figure 7:
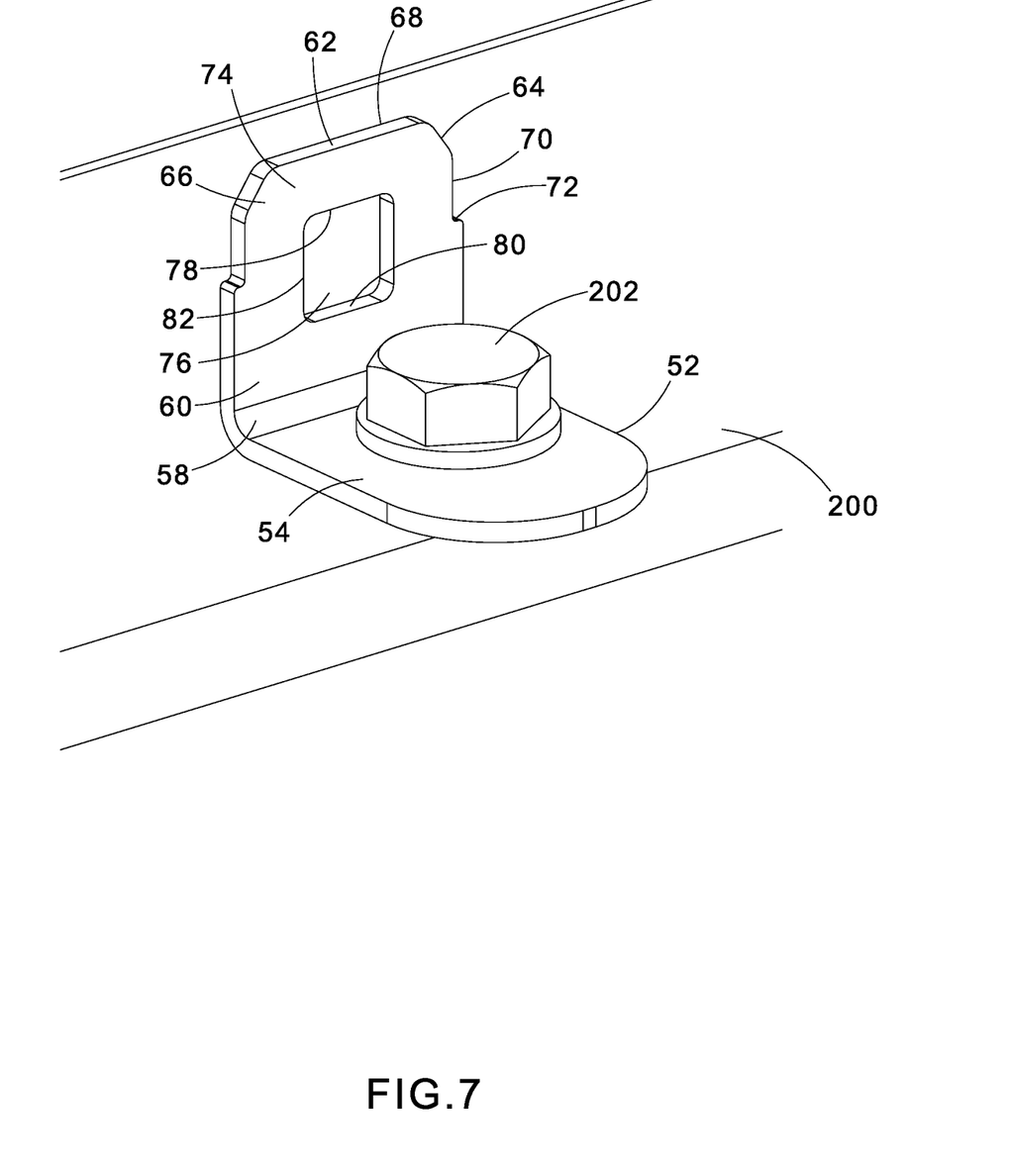
FIG. 7 is a perspective view of the base of FIG. 2 secured to a vehicle frame.
Figure 8:
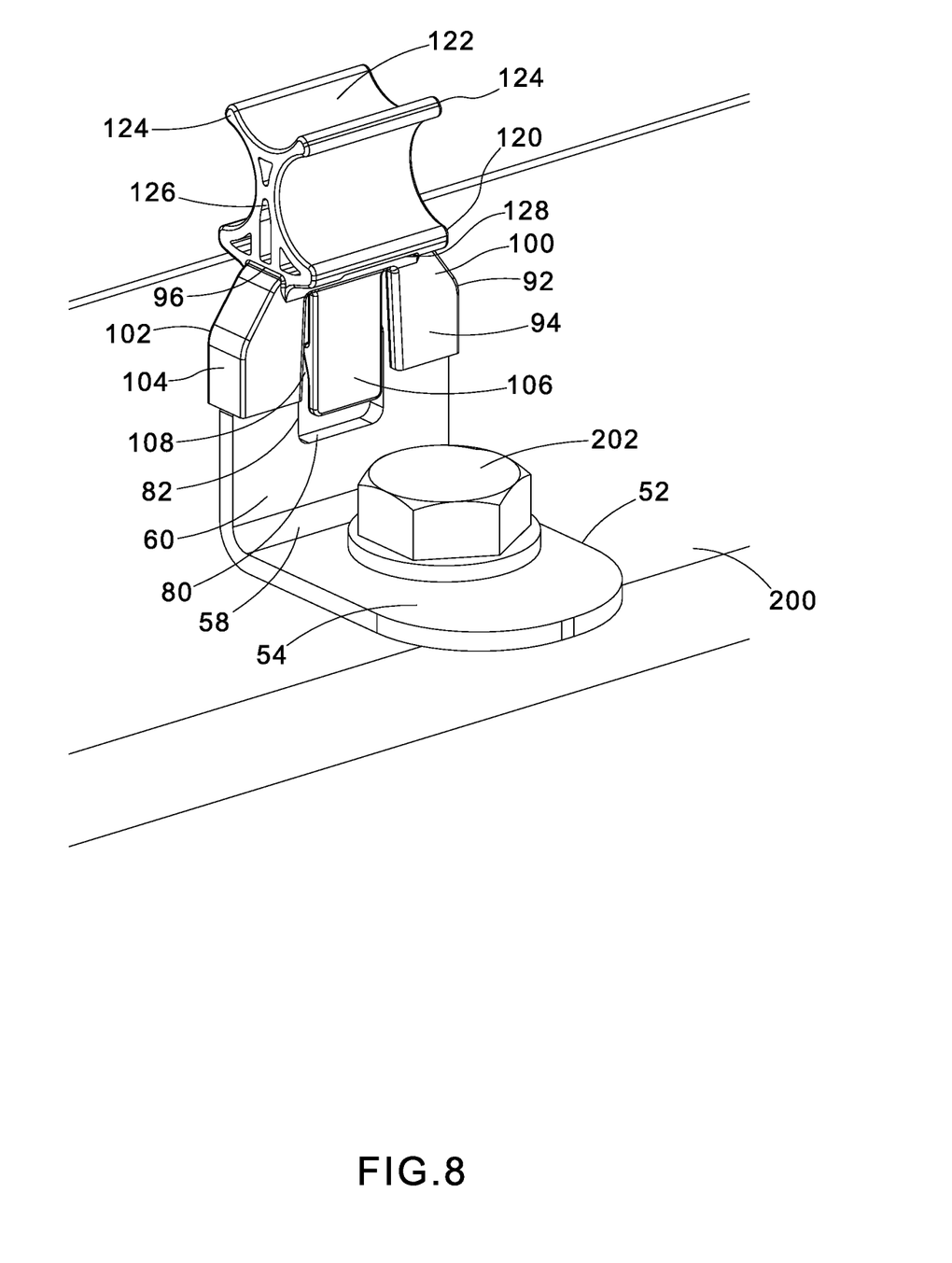
FIG. 8 is a perspective view of the multi-position low profile snap on mount assembly of FIG. 1 secured to a vehicle frame.
Figure 9:
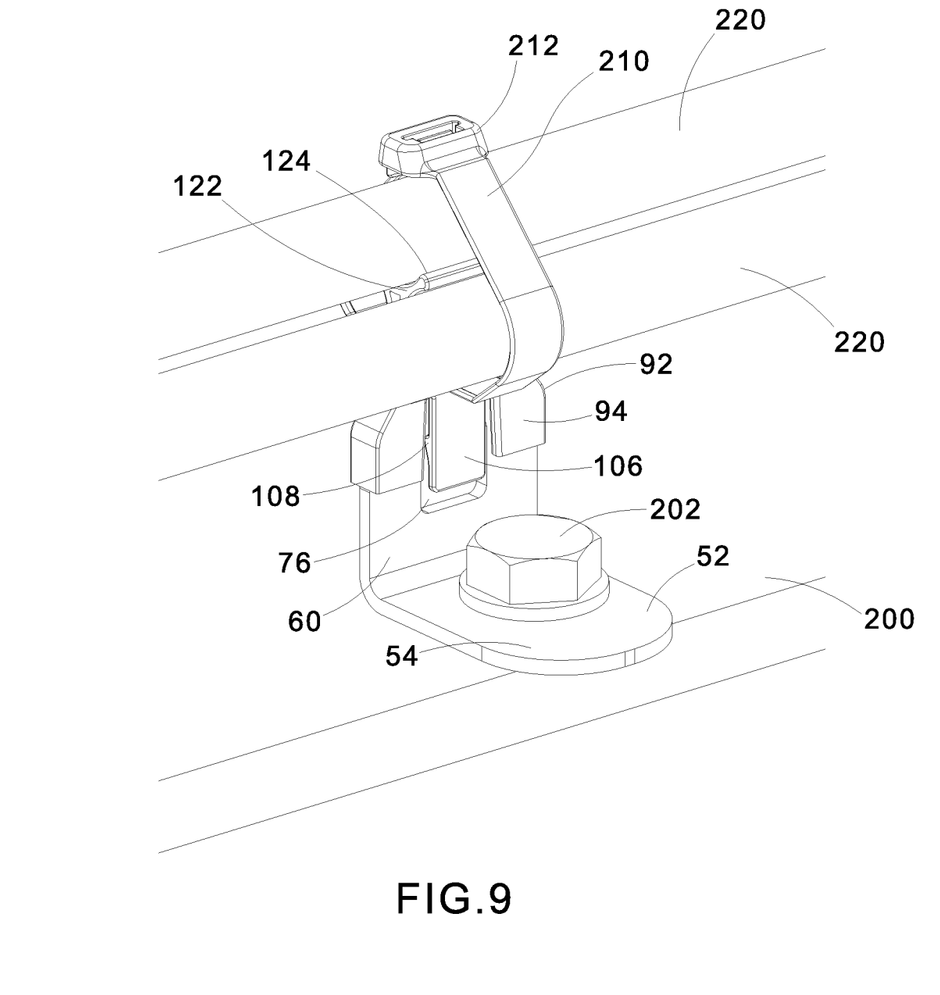
FIG. 9 is a perspective view of the multi-position low profile snap on mount assembly of FIG. 8 with cables secured to the mount assembly.

FIG. 5 illustrates a cross sectional view of the snap on mount 50. The mount component 90 is secured to the base 52 by positioning the upper portion 74 of the mating flange 60 within the mating cavity 110. The latch 108 extending from the latch arm 106 engages the top 78 of the latch window 76 to secure the mount component 90 to the base 52. The bottoms of the legs rest on the horizontal indention of the recessed mating cutouts 72. FIG. 6 is a rear view of the snap on mount 50 with the latch arm 106 blocking the latch window 76 of the base 52.

Figure 10:
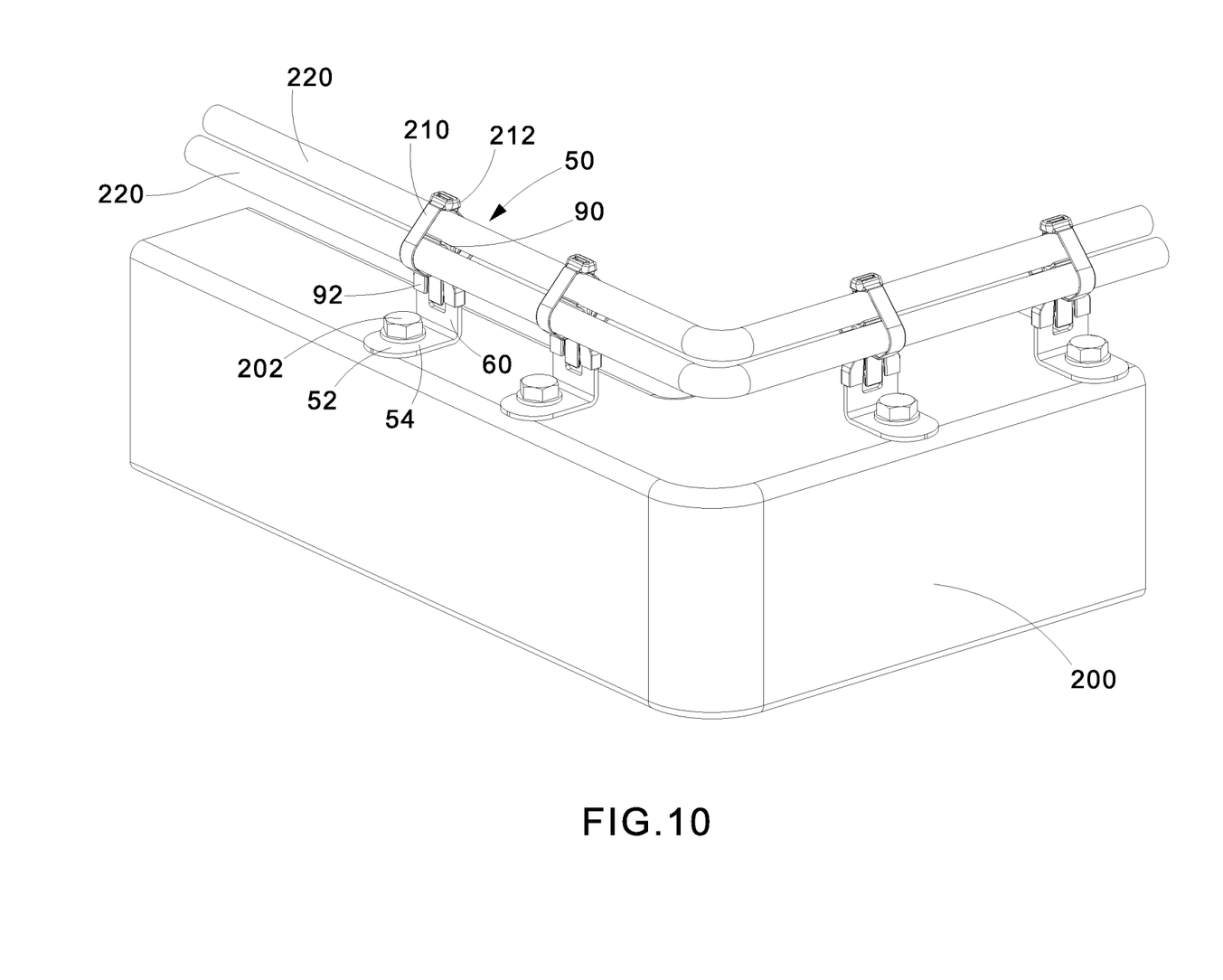
FIG. 10 is a perspective view of a plurality of the multi-position low profile snap on mount assemblies of FIG. 1 secured to a vehicle frame with cables secured to the mount assembly.

FIGS. 7-10 illustrate the multi-position low profile snap on mount 50 as it is installed on a vehicle frame 200. The base 52 is mounted to the structural frame 200 of a vehicle via a fastener 202. The mount component 90 is then placed over the base 52. The tapered corners 64 of the base 52 help guide the base 52 into the mating cavity 110 of the mount component 90. The upper portion 74 of the base 52 is positioned in the mating cavity 110 with the horizontal indentation and vertical side of the recessed mating cutouts 72 engaging the mating cavity 110. The latch arm 106 remains adjacent to the latch window 76 while the latch 108 engages the top 78 of the latch window 76 to secure the mount component 90 to the base 52. Cables 220 are then placed in the cable receiving lobes 122 for routing. A cable tie 210 is threaded through the cable tie pass through slot 128 and wrapped around the cables 220. The cable tie 210 is threaded through the cable tie head 212 and tensioned around the cables 220. Once tensioned, the cable tie tail is removed (not illustrated). FIG. 10 illustrates a plurality of snap on mounts 50 secured to the structural frame 200 of the vehicle. The snap on mounts 50 are aligned along the vehicle frame 200 to facilitate routing of the power cabling in the vehicle.

Figure 11:
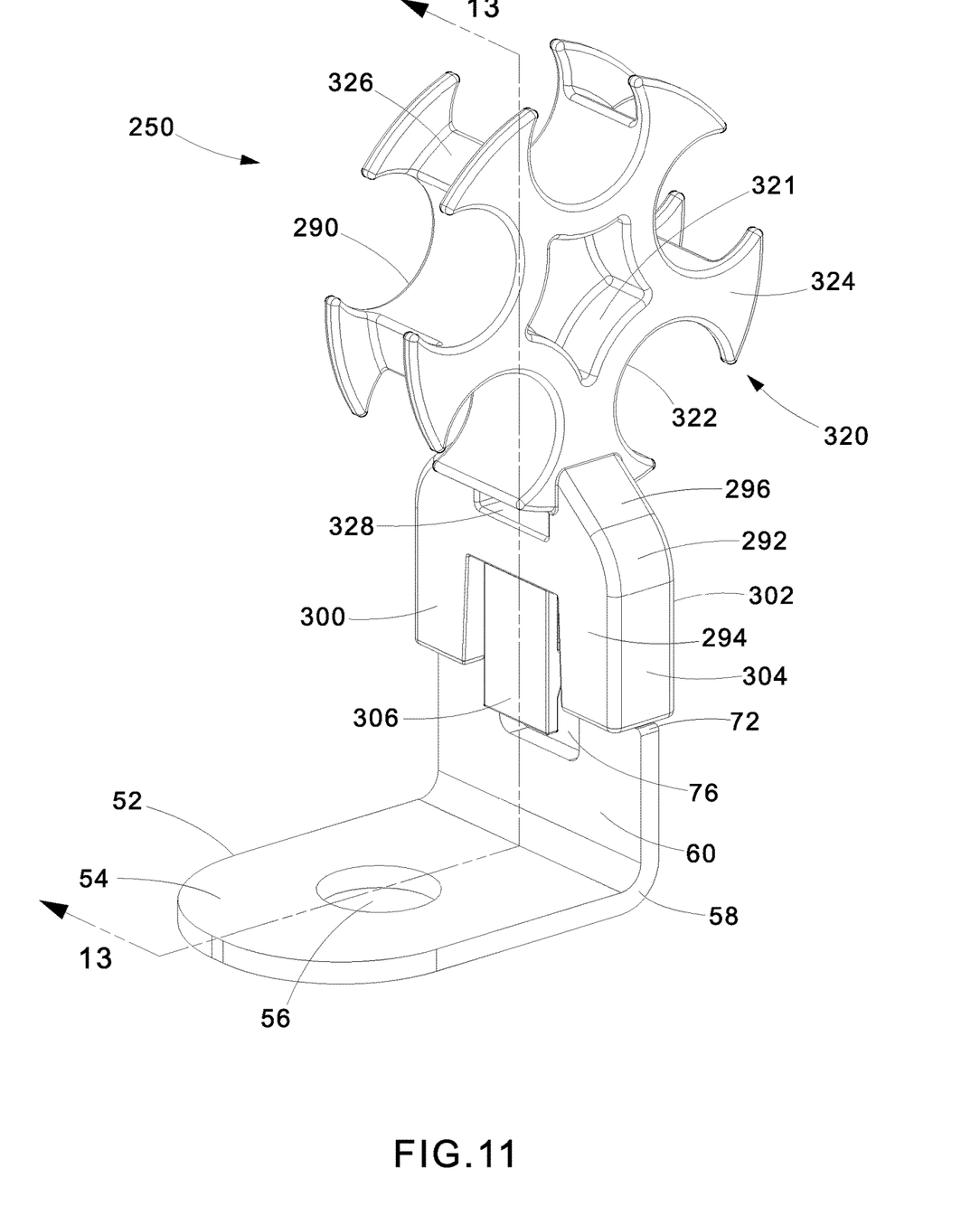
FIG. 11 is a front perspective view of a second embodiment of the multi-position low profile snap on mount assembly of the present invention.
Figure 12:
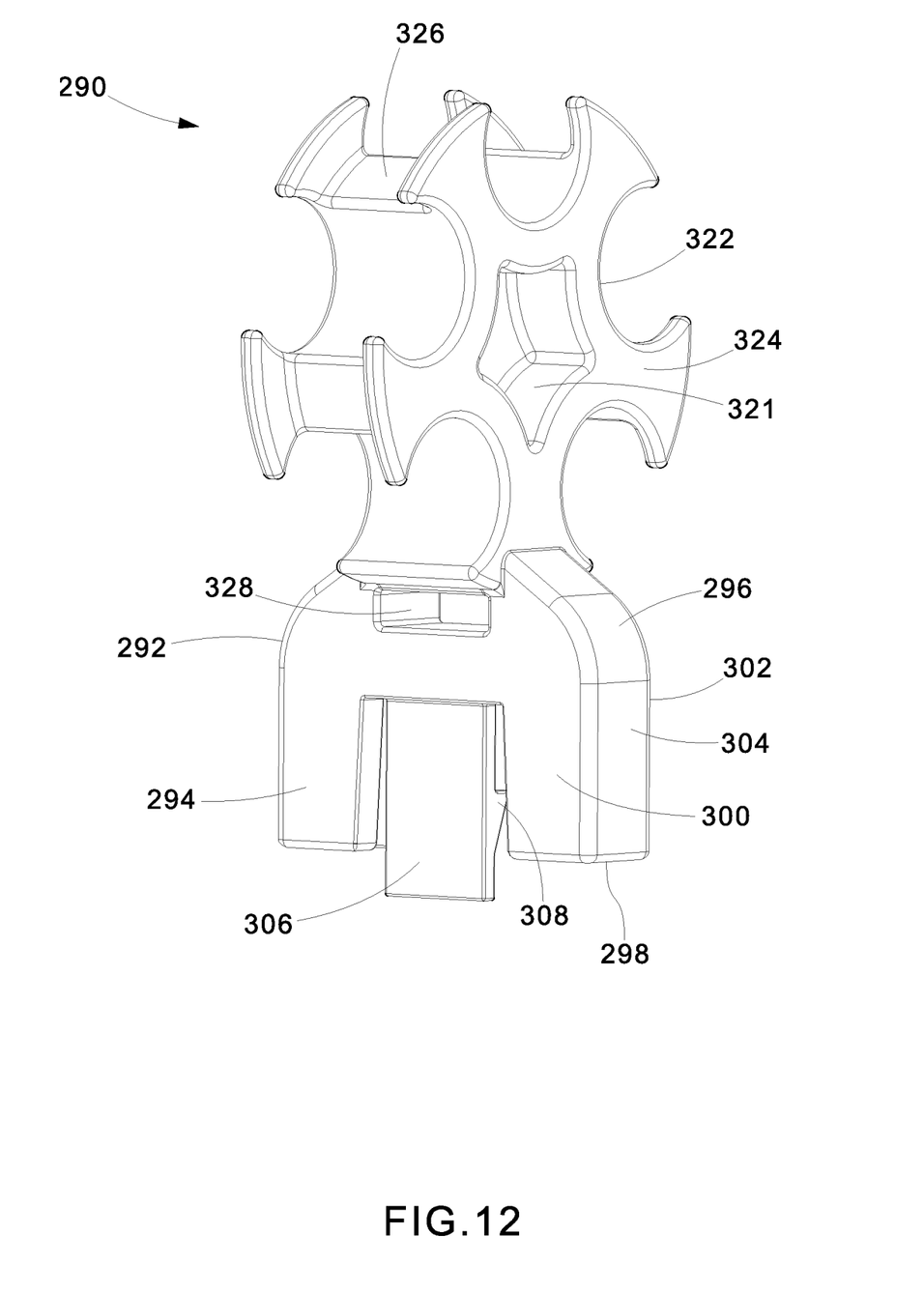
FIG. 12 is a perspective view of the mount component of the multi-position low profile snap on mount assembly of FIG. 11.

FIGS. 11-14 illustrate a second embodiment of the multi-position low profile snap on mount assembly. The multi-position low profile snap on mount assembly 250 includes a base 52 identical to the base described above and a mount component 290 designed to accommodate up to five cables. As illustrated in FIGS. 11 and 12, the mount component 290 includes an attachment member 292 and a cable receiving member 320. The attachment member 292 includes legs 294 with a top 296, a bottom 298, a front 300, a back 302, and sides 304. The attachment member 292 includes a latch arm 306 with a latch 308 extending between each leg 294. The latch arm 306 extends longer than the legs 294 to facilitate engagement with the latch window 76 in the mating flange 60 of the base 52.

The cable receiving member 320 includes and open center 321, cable receiving lobes 322 and cable spacer arms 324 with range taking cavities 326. The cable spacer arms 324 are arranged to define five semicircular cable receiving lobes 322.

The mount assembly 250 also includes a centered cable tie pass thru slot 328 for receiving a cable tie 210 to secure the cables 220 positioned on the cable receiving lobes 322.

Figure 13:
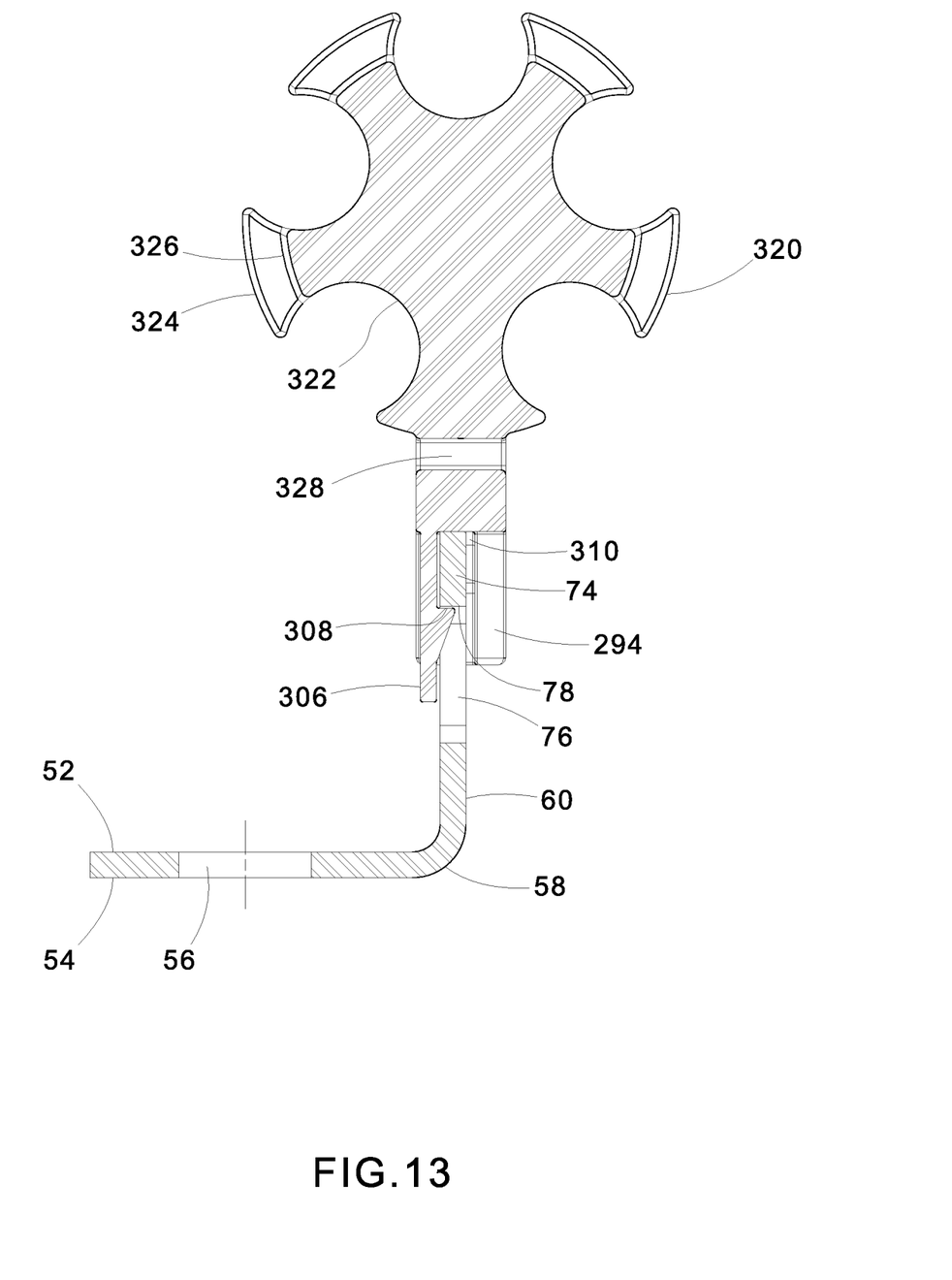
FIG. 13 is a cross sectional view of the multi-position low profile snap on mount assembly of FIG. 11 taken along line 13-13.

As illustrated in FIG. 13, the attachment member 292 also includes a mating cavity 310. The mating cavity 310 is defined by the front 300, back 302 and sides 304 of the legs 294. The attachment member 292 is secured to the base 52 the same as described above with respect to mount component 90. The upper portion 74 of the mating flange 60 of the base 52 is positioned within the mating cavity 310 of the mount component 290. The latch 308 extending from the latch arm 306 engages the top 78 of the latch window 76 to secure the mount component 290 to the base 52.

As described above with respect to the snap on mount 50, cables are placed in the cable receiving lobes 322 of snap on mount 250 to keep the cables separated. A cable tie is thread thru the cable tie pass thru slot, the cable tie is threaded, tensioned, and the tail is removed. The centers of the cable receiving lobes 322 are offset from the circumference of the cable receiving member 320 of the snap on mount 250 which allows cables to be easily snapped into place in the snap in mount 250 during installment. This allows for easier assembly as the installer's hands are allowed to be free to install the cable tie since the cables are secured in the cable receiving lobes 322. Range taking cavities 326 are located at the distal ends of the cable spacer arms 324 to allow the mounts to receive a range of cable sizes. If an installer decides to put smaller cables into the cable receiving lobes 322 of the snap on mount 250, the range taking cavities 326 allow the cable tie to be tightened down to different circumferences thereby keeping the smaller cables in place.

Figure 14:
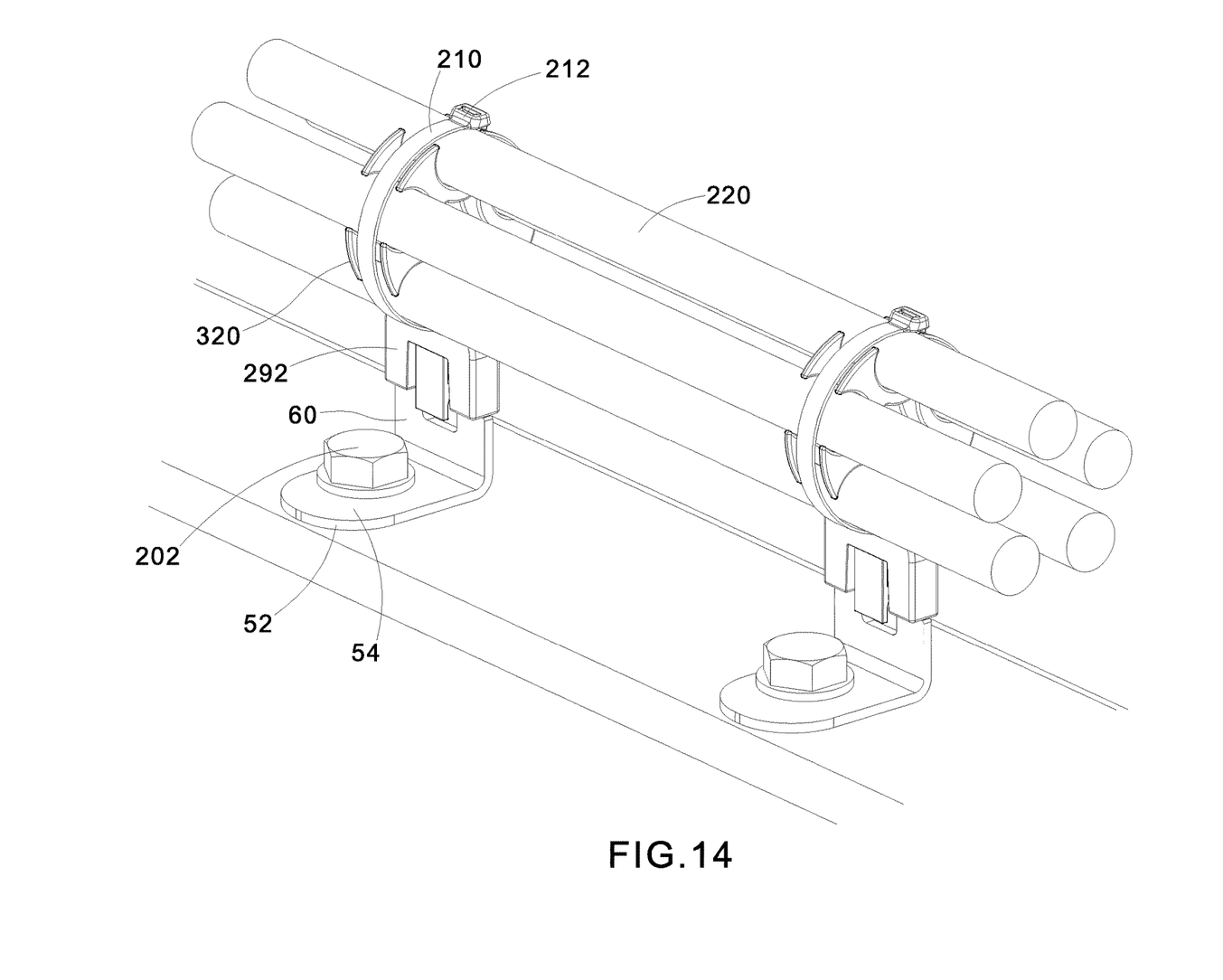
FIG. 14 is a perspective view of a plurality of the multi-position low profile snap on mount assemblies of FIG. 11 secured to a vehicle frame with cables secured to the mount assembly.

FIG. 14 illustrates a plurality of snap on mounts 250 secured to the structural frame 200 of the vehicle. The snap on mounts 250 are aligned along the vehicle frame 200 to facilitate routing of the power cabling in the vehicle.

The snap on mounts of the present invention have a low profile, they are light weight, and they require minimal space along the vehicle frame. The snap on mounts are easy to install and are easy to remove when maintenance is required. The cable spacer arms of the snap on mounts provide ample spacing for adjacent cables thereby eliminating accidental cable contacts. Additionally, if desired, the structural frame can be designed with tapered corners, recessed cutouts, and latch window to directly receive the mount components. This enables the end user to only use a mount component thereby reducing weight, cost, and simplifying the install of the snap on mount.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A mount assembly for securing cables to a vehicle frame, the mount assembly comprising:
    a base having a securement flange and a mating flange with a latch window; and
    a mount component positioned on the base, the mount component having an attachment member and a cable receiving member, wherein the attachment member has a latch arm with a latch extending therefrom;
    wherein the cable receiving member has a lobe stem and cable spacer arms, the lobe stem is a vertical member and the cable spacer arms extend from the lobe stem to form concave cable receiving lobes for receiving cables;

wherein the cable receiving member has a centered open cable s thru slot for receiving a cable tie to secure the cables positioned in the cable receiving lobes;

whereby the latch extending from the latch arm of the attachment member engages the latch window of the mating flange to secure the mount component to the base.

2. The mount assembly of claim 1, wherein the securement flange of the base has a mounting hole for receiving a fastener to secure the base to the vehicle frame.

3. The mount assembly of claim 1, wherein mating flange of the base is perpendicular to the securement flange of the base.

4. The mount assembly of claim 1, wherein the latch window is rectangular with a top, a bottom, and sides.

5. The mount assembly of claim 1, wherein the mating flange includes a top, a front, a back, and sides, the top of the mating flange has tapered corners and the sides of the mating flange have mating cutouts.

6. The mount assembly of claim 1, wherein the attachment member includes a leg positioned on each side of the latch arm; the legs have a top, a bottom, a front, a back, and sides.

7. The mount assembly of claim 6, wherein the attachment member further comprising a mating cavity defined by the front, back and sides of the legs; wherein the mating cavity receives the mating flange of the base.

8. A mount assembly for securing cables to a vehicle frame, the mount assembly comprising:
- a base having a securement flange and a mating flange with a latch window, the mating flange includes a top, a front, a back, and sides, the top of the mating flange has tapered corners and the sides of the mating flange have mating cutouts; and
- a mount component positioned on the base, the mount component having an attachment member and a cable receiving member, wherein the attachment member has a latch arm with a latch extending therefrom, the attachment member includes legs positioned on each side of the latch arm; the legs have a top, a bottom, a front, a back, and sides defining a mating cavity in the attachment member;
- wherein the cable receiving member has a centered unobstructed cable tie pass thru slot for receiving a cable tie to secure cables positioned in the cable receiving member;
- wherein the mating cavity receives the mating flange of the base and the latch engages the latch window of the mating flange to secure the mount component to the base.

9. The mount assembly of claim 8, wherein the cable receiving member further comprising a lobe stem with cable spacer arms that define concave cable receiving lobes for receiving the cables.

10. The mount assembly of claim 8, wherein the cable receiving member further comprising cable spacer arms arrange to define semi circular cable receiving lobes for receiving the cables.

11. The mount assembly of claim 10, wherein the cable spacer arms include range taking cavities located at the distal ends of the cable spacer arms to allow the mount assembly to receive a range of cable sizes.

12. A mount assembly for securing cables to a vehicle frame, the mount assembly comprising:
- a base having a securement flange and a mating flange with a latch window; and
- a mount component positioned on the base, the mount component having an attachment member and a cable receiving member;
- wherein the attachment member has a latch arm with a latch extending therefrom;
- wherein the cable receiving member has cable spacer arms arranged to define semi circular cable receiving lobes for receiving cables;
- wherein the cable receiving member has a centered open cable tie pass thru slot for receiving a cable tie to secure the cables positioned in the semicircular cable receiving lobes;
- whereby the latch extending from the latch arm of the attachment member engages the latch window of the mating flange to secure the mount component to the base.

13. The mount assembly of claim 12, wherein the cable spacer arms include range taking cavities located at the distal ends of the cable spacer arms to allow the mount assembly to receive a range of cable sizes.

* * * * *